United States Patent [19]

Iida

[11] Patent Number: 4,917,441
[45] Date of Patent: Apr. 17, 1990

[54] PLASTIC WHEEL COVER WITH FASTENING DEVICE

[75] Inventor: Issao Iida, Saitama Prefecture, Japan

[73] Assignee: Kanto Seiki Co., Ltd., Omiya, Japan

[21] Appl. No.: 215,769

[22] Filed: Jul. 6, 1988

[30] Foreign Application Priority Data

Jul. 13, 1987 [JP] Japan .................................. 62-174553
Aug. 7, 1987 [JP] Japan ............................ 62-120990[U]
Sep. 30, 1987 [JP] Japan ............................ 62-149769[U]

[51] Int. Cl.⁴ .............................................. B60B 7/04
[52] U.S. Cl. ............................... 301/37 PB; 301/37 TP
[58] Field of Search ............... 301/37 R, 37 P, 37 TP, 301/37 PB

[56] References Cited

U.S. PATENT DOCUMENTS

| | | | |
|---|---|---|---|
| 3,747,984 | 7/1973 | Andrews | 301/37 P |
| 4,352,525 | 10/1982 | Foster et al. | 301/37 PB |
| 4,361,359 | 11/1982 | Binnewies et al. | 301/37 P X |
| 4,366,992 | 1/1983 | Enke | 301/37 PB X |
| 4,457,559 | 7/1984 | Renz | 301/37 P |
| 4,470,639 | 9/1984 | Loper | 301/37 P X |
| 4,529,251 | 7/1985 | Schobbe | 301/37 P |
| 4,708,398 | 11/1987 | Loren | 301/37 R X |
| 4,740,038 | 4/1988 | Okano et al. | 301/37 R X |

FOREIGN PATENT DOCUMENTS

| | | |
|---|---|---|
| 247330 | 12/1987 | European Pat. Off. |
| 255929 | 2/1988 | European Pat. Off. |
| 62-160902 | 7/1987 | Japan . |
| 62-258802 | 11/1987 | Japan . |
| 62-279101 | 12/1987 | Japan . |
| 2126175 | 3/1974 | United Kingdom . |

*Primary Examiner*—Russell D. Stormer
*Attorney, Agent, or Firm*—Foley & Lardner, Schwartz, Jeffery, Schwaab, Mack, Blumenthal & Evans

[57] ABSTRACT

A plastic wheel cover is disclosed, which comprises a cover proper constructed of a molded plastic; a plurality of latching units integrally and circularly arranged on one surface of the cover proper, each unit including a catching pawl extending away from the cover proper and a spring holder located near the catching pawl; and a ring spring held by the spring holders in a manner to press back surfaces of the catching pawls thereby to resilliently bias the catch pawls radially outwardly with respect to the cover proper.

42 Claims, 17 Drawing Sheets

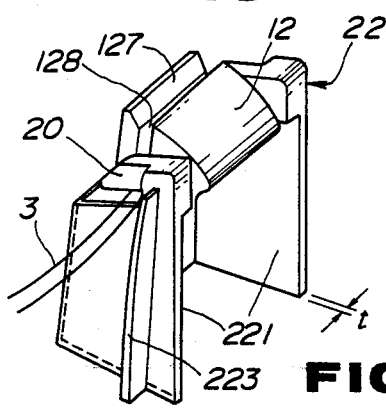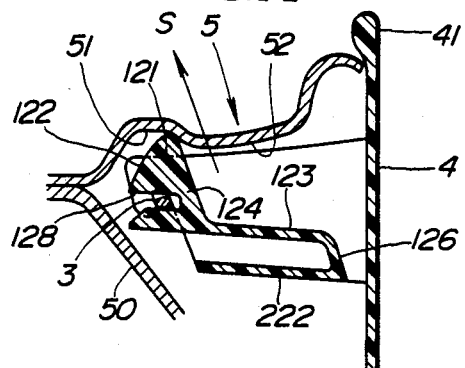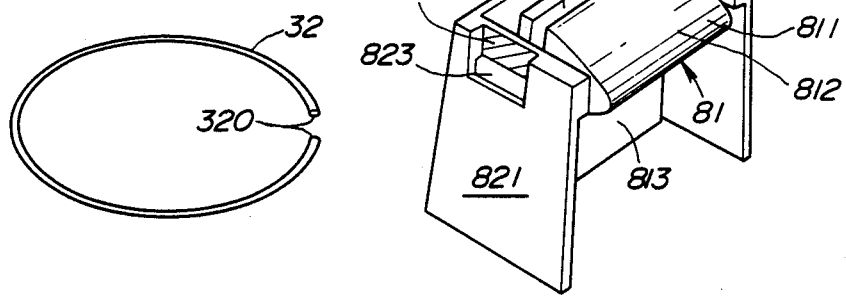

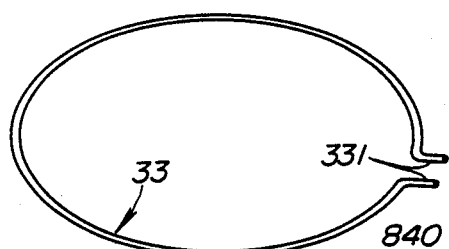
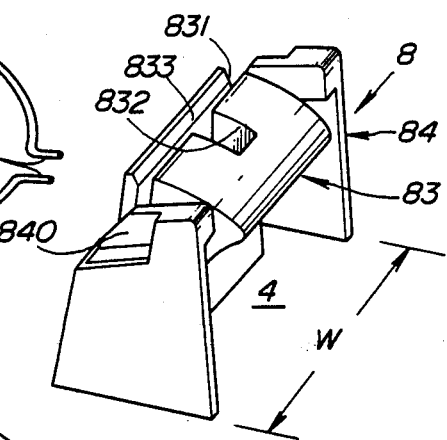
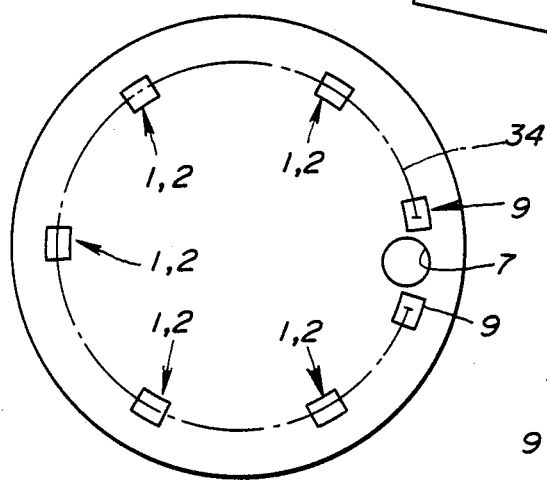
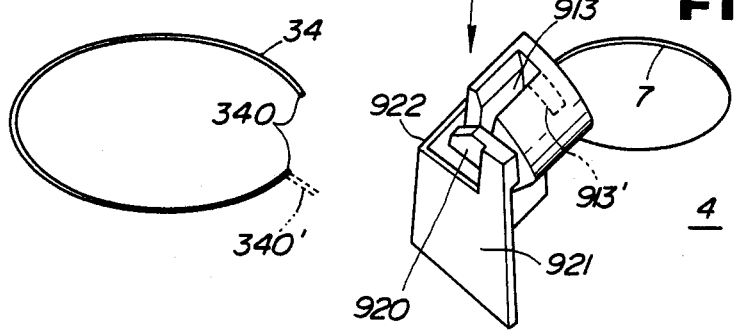

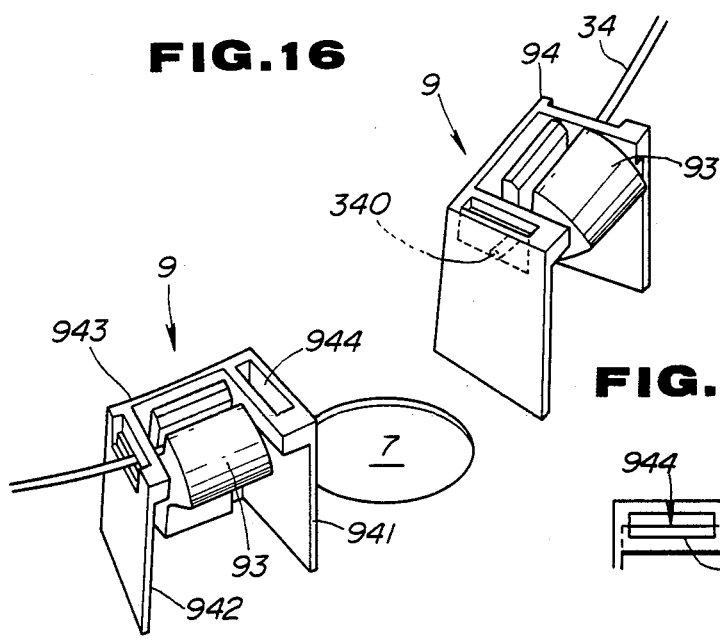
FIG.16
FIG.17
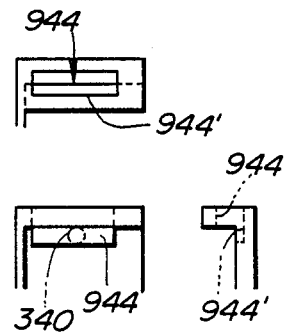
FIG.18
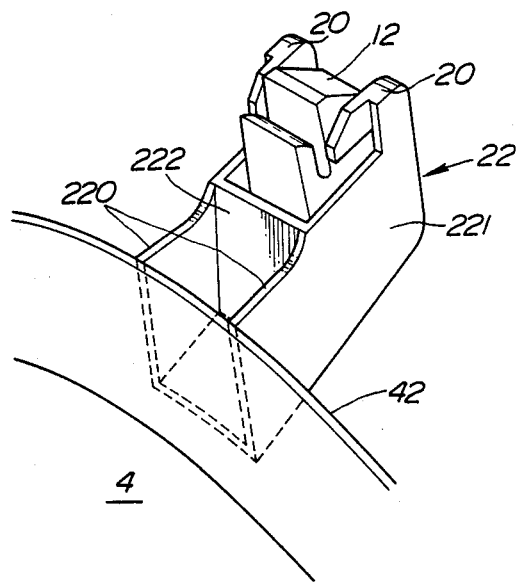

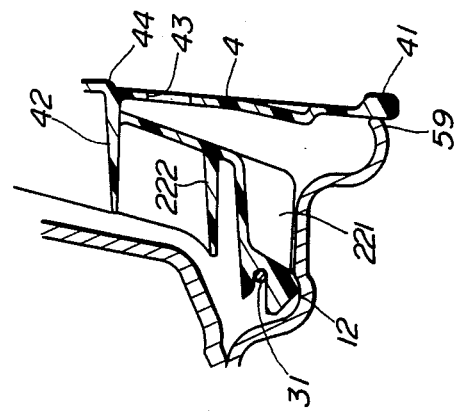
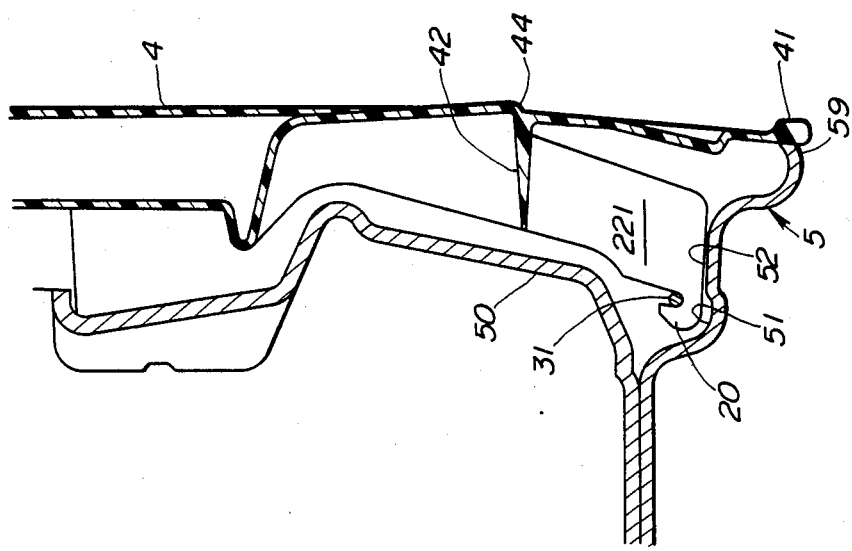

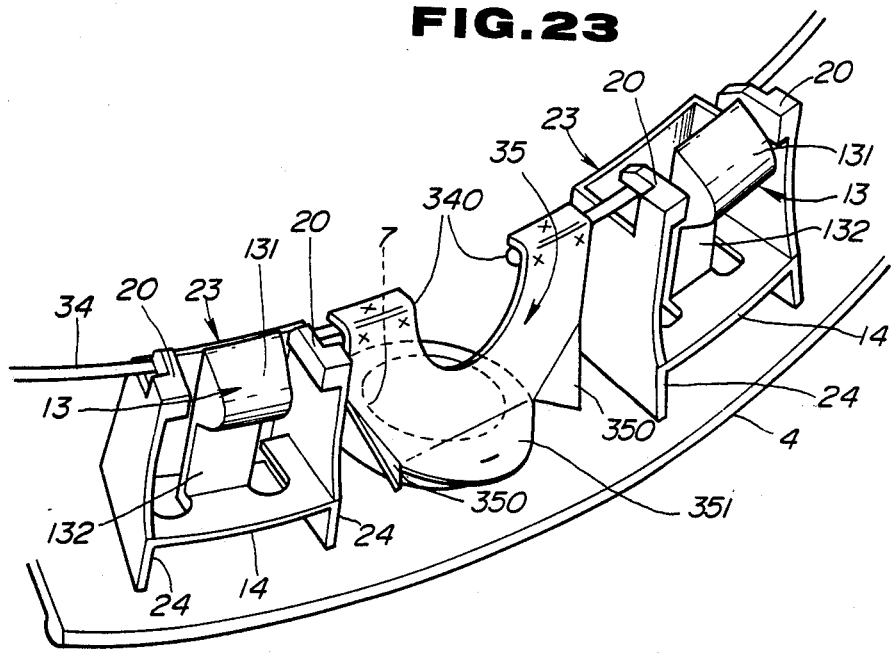
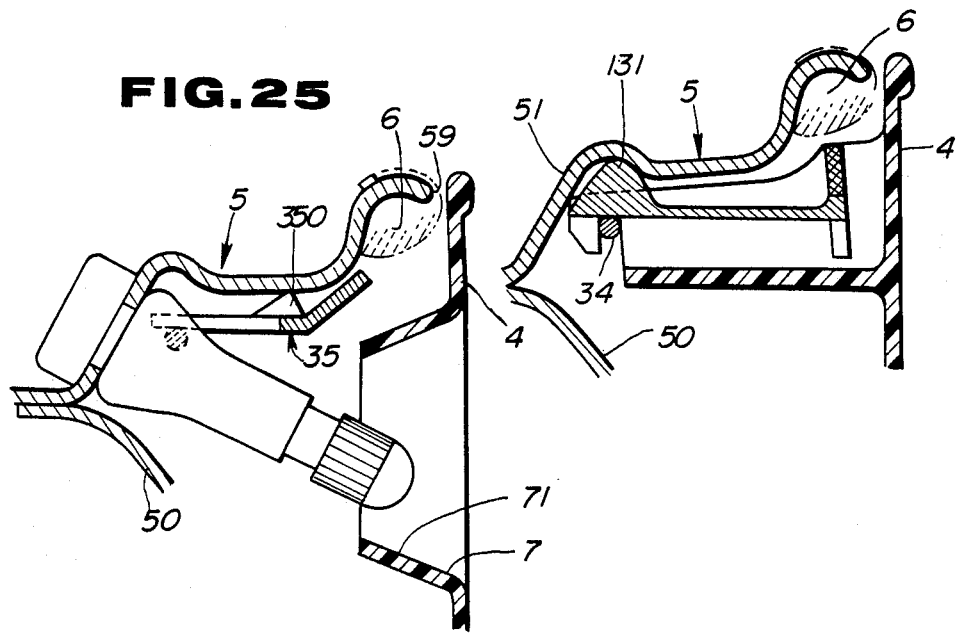

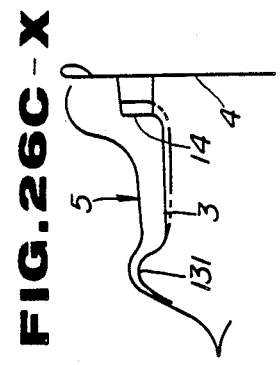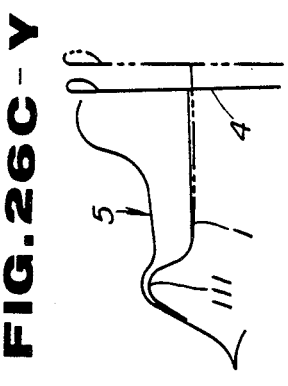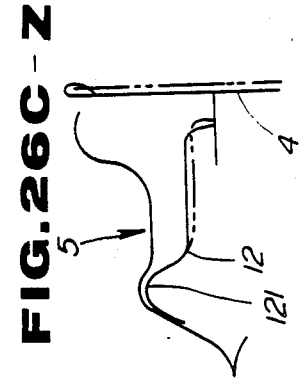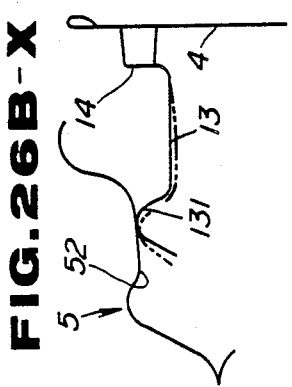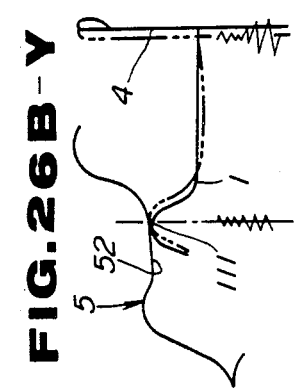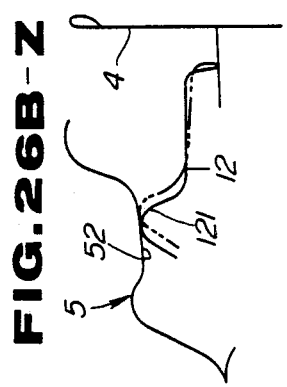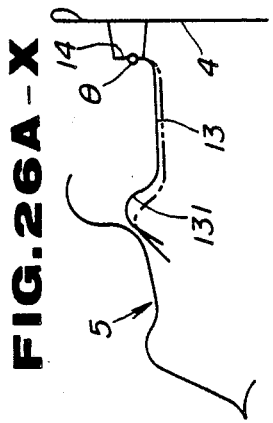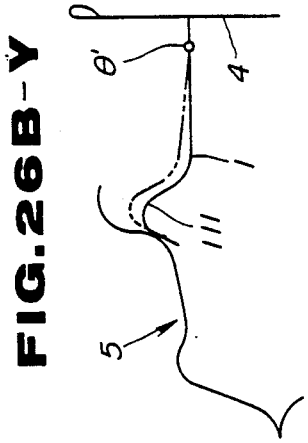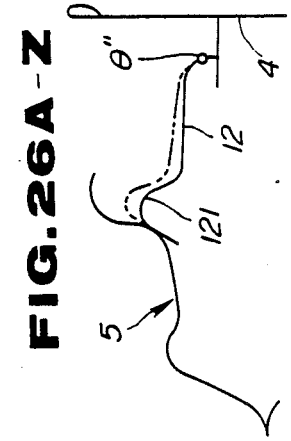

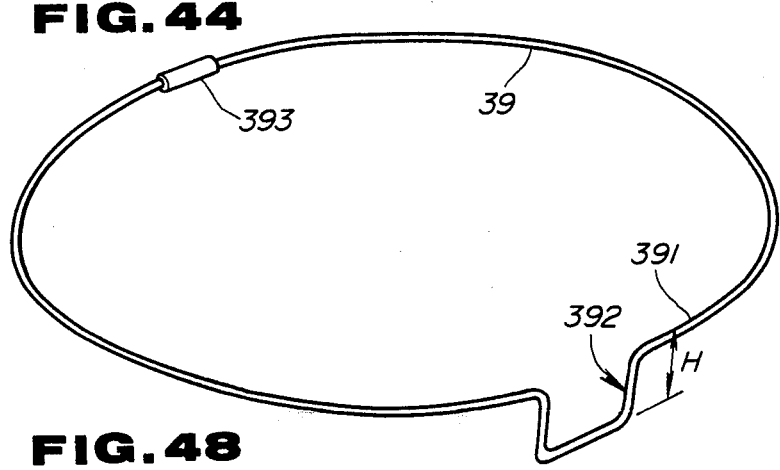
FIG. 44
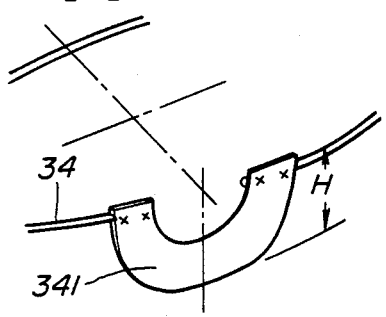
FIG. 48
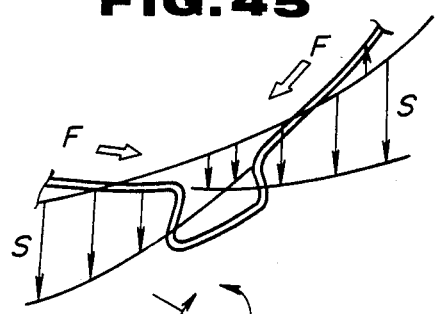
FIG. 45
FIG. 46
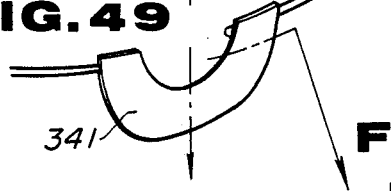
FIG. 49
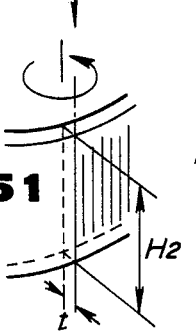
FIG. 51
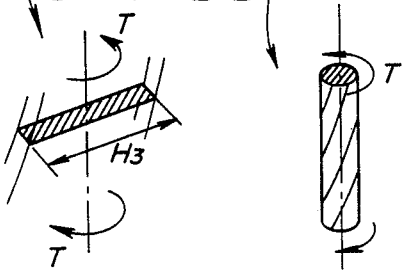
FIG. 50   FIG. 47

4,917,441

PLASTIC WHEEL COVER WITH FASTENING DEVICE

BACKGROUND OF THE INVENTION

1. Field of the Invention

The present invention relates in general to a wheel cover detachably attached to a wheel rim for enclosing and decorating the same, and more particularly to a plastic wheel cover which is equipped with a spring-biased fastening device through which the cover is detachably connected to the wheel rim.

2. Description of the Prior Art

Hitherto, plastic wheel covers have been widely used because of the light weight, high durable, rustproof and easily moldable characteristics of the plastics from which the cover is produced. However, the plastic wheel covers have some drawbacks which originate from a notable permanent set exhibited by the plastics after long use thereof. This notable permanent set has disabled the plastic wheel cover from having, by themselves, resilient catching pawls which are used for retaining the cover to the wheel (viz., the wheel rim). Thus, usually, a plurality of metal springs or the like are employed for assisting or assuring a prolonged retaining function of the catching pawls. However, mounting numerous metal springs on the plastic wheel cover has brought about a complicated configuration of the fastening device on the cover. Thus, hitherto, manufacturing or molding of the plastic wheel covers of such type with high productivity has been difficult.

In view of these drawbacks, various measures have been hitherto proposed, some being disclosed in Japanese Patent First Provisional Publications Nos. 62-160902, 62-258802 and 62-279101, which disclose a fastening device integrally provided on the plastic wheel cover. That is, the fastening device disclosed by them comprises a plurality of catching pawls integral with a plastic cover proper and circularly arranged on the cover, a plurality of spring holders integral with the cover and circularly arranged on the cover and a ring spring held by the holders in a manner to bias the catching pawls radially outwardly. The applicants have noted that some of the drawbacks as mentioned hereinabove are solved by the fastening device of the measure disclosed by the references. However, due to its inherency in construction, the fastening device is obliged to have bulky catching pawls and thus the degree of freedom in design of the cover is considerably limited. Beside, the resilient deformation of the ring spring is considerably restricted thereby limiting the biasing force produced by the ring spring. As is known, if the biasing force of the ring spring fails to be set at a desired level, fitting the cover to the wheel (viz., wheel rim) is not carried out with a comfortable fitting feeling. Furthermore, in a severe case, the wheel cover is disconnected from the wheel during running of the motor vehicle.

SUMMARY OF THE INVENTION

It is therefore an object of the present invention to provide a plastic wheel cover with a fastening device, which is free of the above-mentioned drawbacks.

According to the present invention, there is provided a plastic wheel cover which comprises a cover proper constructed of a molded plastic; a plurality of latching units integrally and circularly arranged on one surface of the cover proper, each unit including a catching pawl extending away from the cover proper and a spring holder located near the catching pawl; and a ring spring held by the spring holders in a manner to press back surfaces of the catching pawls thereby to resiliently bias the catch pawls radially outwardly with respect to the cover proper.

BRIEF DESCRIPTION OF THE DRAWINGS

Other objects and advantages of the present invention will become apparent from the following description when taken in conjunction with the accompanying drawings, in which:

FIGS. 1 to 5 are drawings showing a first embodiment of the present invention, in which:

FIG. 1 is a perspective view of a plastic wheel cover of the first embodiment, showing a fastening device which comprises six latching units mounted on the cover proper;

FIG. 2 is an enlarged perspective view of one of the latching units;

FIG. 3 is a sectional view of the unit under a condition wherein the plastic wheel cover is fully engaged with a wheel rim;

FIG. 4 is a view similar to FIG. 3, but showing a condition wherein the plastic wheel cover is about to engage with the wheel rim; and FIG. 5 is a partially cut perspective view of the latching unit, which is presented for explaining an advantage of the first embodiment;

FIGS. 6 and 7 are drawings showing a second embodiment of the present invention, in which:

FIG. 6 is a perspective view of one latching unit employed in a fastening device of the second embodiment; and FIG. 7 is a sectional view of the latching unit of the second embodiment under a condition wherein the plastic wheel cover is fully engaged with a wheel rim;

FIGS. 8 to 10 are drawings showing a third embodiment of the present invention, in which:

FIG. 8 is a plan view of a plastic wheel cover of the third embodiment, showing a fastening device comprising five latching units;

FIG. 9 is a perspective view of a ring spring employed in the third embodiment; and FIG. 10 is a perspective view of one of the latching units of the fastening device;

FIGS. 11 and 12 are drawings showing a fourth embodiment of the present invention, in which:

FIG. 11 is a perspective view of a ring spring employed in the fourth embodiment; and FIG. 12 is a perspective view of one of the latching units mounted on a plastic wheel cover of the fourth embodiment;

FIGS. 13 to 15 are drawings showing a fifth embodiment of the present invention, in which:

FIG. 13 is a plan view of a plastic wheel cover of the fifth embodiment, showing seven latching units mounted on the cover proper;

FIG. 14 is a perspective view of a ring spring employed in the fifth embodiment; and FIG. 15 is a perspective view of two latching units located near an air valve receiving aperture of the cover proper;

FIGS. 16 and 17 are drawings showing a sixth embodiment of the present invention, in which:

FIG. 16 is a perspective view of two latching units located near an air valve receiving aperture of the cover proper; and FIG. 17 shows but partially plan, front and side views of one of the latching units;

FIGS. 18 to 22 are drawings showing a seventh embodiment of the present invention, in which:

FIG. 18 is a perspective view of one of the latching units employed in the seventh embodiment;

FIG. 19 is a sectional view of one of the latching units, showing a condition wherein the plastic wheel cover is fully engaged with a wheel rim;

FIG. 20 is a sectional view of the other latching unit, showing a condition wherein the plastic wheel cover is fully engaged with a wheel rim;

FIG. 21 is an enlarged plan view of a part of the plastic wheel cover of the seventh embodiment; and FIG. 22 is a view similar to FIG. 21, which is presented for showing an advantage of the seventh embodiment;

FIGS. 23 to 25 are drawings showing an eighth embodiment of the present invention, in which:

FIG. 23 is a perspective view of a part of a plastic wheel cover of the eighth embodiment, showing two latching units located near an air valve receiving aperture of the cover proper;

FIG. 24 is a sectional view of one of the latching units in a condition wherein the plastic wheel cover is fully engaged with a wheel rim; and FIG. 25 is a sectional view of the plastic wheel cover at the portion where the air valve is placed;

FIGS. 26A, 26B and 26C are schematic illustrations of latching units of plastic wheel covers, in which, in each illustration, denoted by "x" is the latching unit employed in the eighth embodiment, denoted by "y" is a latching unit employed in an example wherein a catching pawl extends from the cover proper, and denoted by "z" is a latching unit employed in another example wherein the catching pawl extends from a back wall of a spring holder;

FIGS. 27–30 are drawings showing a ninth embodiment of the present invention, in which:

FIG. 27 is a sectional view of one of the latching units employed in the ninth embodiment, showing a condition wherein the cover is fully engaged with a wheel rim; and FIG. 28 is an enlarged perspective view of a catching pawl of the latching unit;

FIG. 29 is a sectional view of the latching unit employed in the ninth embodiment, showing the manner in which the latching unit is engaged with the wheel rim;

FIG. 30 is a view similar to FIG. 29, but showing the latching unit employed in the eighth embodiment;

FIGS. 31 and 32 are drawings showing a tenth embodiment of the present invention, in which:

FIG. 31 is an enlarged perspective view of a latching unit employed in the tenth embodiment; and FIG. 32 is a schematic illustration of the latching units for explaining an advantage achieved by the tenth embodiment;

FIGS. 44 to 47 are drawings showing a conventional metal ring spring, which are presented for explaining an advantage given by the present invention;

FIGS. 48 to 51 are drawings for explaining advantages possessed by the eighth embodiment of FIG. 23;

DETAILED DESCRIPTION OF THE INVENTION

Referring to FIGS. 1 to 5 of the drawings, there is shown a plastic wheel cover of a first embodiment of the present invention.

The plastic wheel cover comprises a wheel cover proper 4 constructed of a molded plastic, a plurality (six in the illustrated embodiment) of latching units integrally formed on a circular base portion 4' of the cover proper 4, and a metal ring spring 3 held by and extending along the latching units. As will be understood as the description proceeds, the latching units and the ring spring 3 constitute a fastening device which is used for detachably fitting the cover 4 to an associated wheel (viz., wheel rim). As is seen from FIG. 1, the latching units are circularly arranged on the cover proper 4 to allow the ring spring 3 to be concentric with the cover proper 4. The cover proper 4 is formed with a circular aperture 7 through which an air valve (not shown) of a wheel is exposed to the outside when the cover 4 is properly fitted to the wheel.

Figure 1:
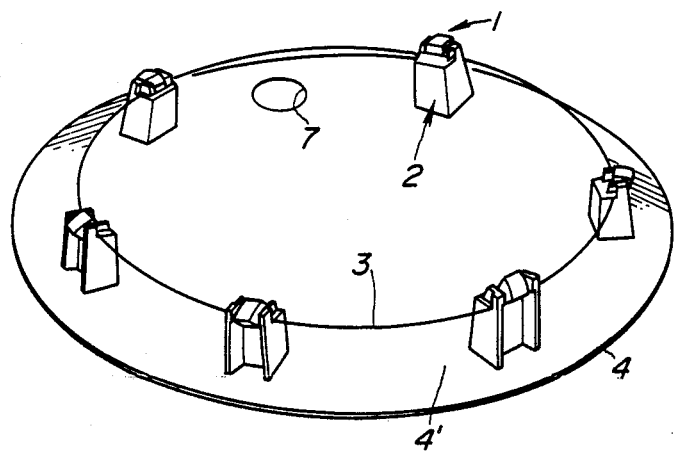
Figure 2:
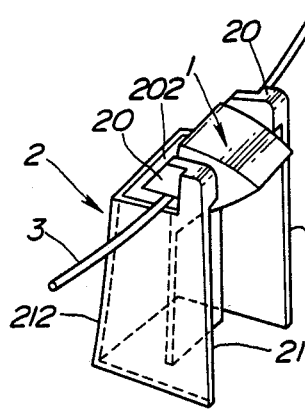

As is best shown in FIG. 2, each latching unit comprises a catching pawl 1 and a spring holder 2 which are integrally formed on the cover proper 4.

Figure 3:
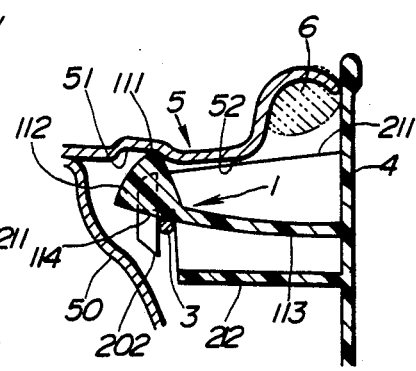

As is seen from FIG. 3, the catching pawl 1 comprises generally an enlarged head portion 111 having a smoothly curved upper surface 112 and a back surface 114 formed thereon, and a resiliently deformable stay portion 113 extending from the cover proper 4 to the head portion 111.

As is seen from FIG. 2, the spring holder 2 is arranged to enclose the catching pawl 1 and thus comprises spaced side walls 211 and 211 which put therebetween the catching pawl 1 and a back wall 212 which extends between the side walls 211 and 211. Each side wall 211 is formed at its top with a head 20 having a slit (no numeral) defined therebetween. The ring spring 3 is put into the slits of the spring holder 2 of each latching unit to press the back surface 114 of the head portion 111 of the catching pawl 1. That is, when setting the ring spring 3 to the spring holders 2 is needed, the same is somewhat constructed against the counterforce thereof and put into the slits of all the spring holders 2 evenly. In order to facilitate the setting of the ring spring 3 to the spring holders 2, the head 20 of each side wall 211 is formed with a tapered surface 202 as is seen from FIG. 5. Thus, upon assembly, the catching pawls 1 of the latching units are biased radially outwardly by the ring springs 3. It is to be noted that the outward displacement of each catching pawl 1 caused by the biasing force of the ring spring 3 is stopped at an imaginary plane 201 (see FIG. 4) which includes bottoms of the slits of the corresponding spring holder 2. If desired, each spring holder 2 may have another configuration. For example, a holder having a shape corresponding to one of the side walls 211 may be used if a sufficient mechanical strength is possessed by the same. Furthermore, in order to avoid interference with an air valve projected from a corresponding wheel (viz. wheel rim), the ring spring 3 may have a bent portion (not shown) at a portion facing the aperture 7 of the cover 4.

The molding of the wheel cover 4 having the above-mentioned structure is easily achieved by using slidable molding dies. That is, before molding, sliding die blocks (not shown) are inserted into the space defined between the catching pawl 1 and the spring holder 2, and after molding, the blocks are removed from the space. With this molding technique, the catching pawls 1 and the spring holders 2 can have each a reduced thickness "t" (see FIG. 5) at the shank portion thereof. Thus, the outer decorative surface of the cover proper 4 is prevented from producing unsightly wrinkles or creases.

As is shown in FIG. 3, a wheel to which the cover 4 is to be fitted has a wheel rim 5 which is coaxially and securely disposed on a wheel disc 50. The wheel rim 5 has at its inboard part an annular groove 51 and at its outboard part an annular bank portion 52. Thus, a shoulder portion is defined between groove 51 and the annular bank 52.

Figure 4:
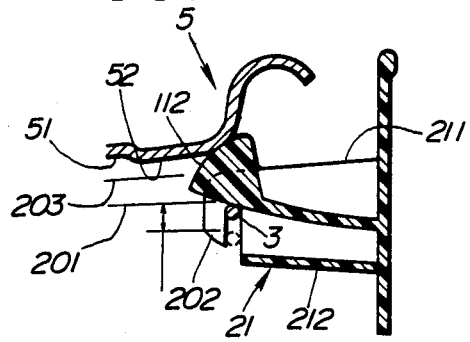
Figure 5:
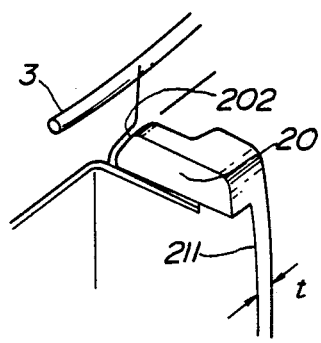

When attachment of the wheel cover 4 to the wheel is required, the wheel cover 4 is pressed against the wheel having the latching units protruded into the cylindrical space defined by the wheel rim 5. During this, the head portion 111 of each catching pawl 1 slides inwardly on the annular bank portion 52 of the rim 5 against the sliding resistance promoted by the biasing force of the ring spring 3, and finally the head portion 111 falls into the annular groove 51 with an aid of the biasing force of the ring spring 3. In this condition, due to the work of the ring spring 3, the head portions 111 of the catching pawls 1 are resiliently biased outwardly thereby assuring a so-called latching engagement between the head portions 111 and the shoulder portion of the wheel rim 5 of the wheel. Designated by numeral 203 in FIG. 4 is an imaginary plane which includes outboard edges of the side walls 211 and 211 of each spring holder 2. Upon proper coupling of the plastic wheel cover 4 with the wheel rim 5, the outboard edges are spaced apart from the annular bank 52 of the wheel rim 5 by about 1 to 2 mm. This means that the inevitable radial displacement of the wheel cover 4 during running of the vehicle is limited to a small degree thereby preventing the catching pawl 1 from being applied with an abnormally big stress. Thus, the catching pawl 1 has a prolonged life.

In the following, advantages of the above-mentioned first embodiment will be described.

First, since the fastening device of the cover 4 is compact in size, the plastic wheel cover 4 can be molded into various shapes. This means improvement in selecting the design of the wheel cover 4.

Second, because the thickness "t" (see FIG. 5) of the structure of each latching unit is reduced, the plastic wheel cover 4 can be prevented from producing on its outer surface unsightly creases and wrinkles.

Third, since the catching pawls 1 to which the ring spring 3 contacts have each relatively thin construction as compared with the afore-mentioned conventional one, the biasing force produced by the ring spring 3 can be effectively transmitted to the catching pawls 1 thereby assuring the function of the fastening device.

Referring to FIGS. 6 and 7, there is shown a plastic wheel cover 4 of a second embodiment of the present invention. Each latching unit of this embodiment comprises a catching pawl 12 and a spring holder 22. The catching pawl 12 is biased by a ring spring 3 which is the same as that mentioned in the first embodiment.

The catching pawl 12 comprises an enlarged head portion 121 having a smoothly curved upper surface 122 and a back surface formed thereon. The head portion 121 is formed with a slit 128 for receiving therein a part of the ring spring 3. For facilitating the insertion of the ring spring 3 into the slit 128, the mouth portion of the same is tapered at 127. The catching pawl 12 further comprises a resiliently deformable stay portion 123 which extends from a lower part of an after-mentioned back wall 222 to the head portion 121. Designated by numeral 126 in FIG. 7 is a lower bent part of the stay portion 123, through which the catching pawl 12 is integrally connected to the back wall 222.

The spring holder 22 of the second embodiment comprises spaced side walls 221 and 221 which put therebetween the catching pawl 12 and a back wall 222 which extends between the side walls 221 and 221. As is described hereinabove, the back wall 222 has a portion from which the stay portion 123 of the catching pawl 12 extends. Similar to the first embodiment, each side wall 221 is formed at its top with a head 20 having a slit (no numeral) defined therebetween. The slit below the head 20 is somewhat inclined for the purpose which will be clarified hereinafter. Each side wall 221 is formed with a reinforcing rib 223 to effect a robust construction of the spring holder 22. If desired, the back wall 222 may be so constructed as to leave a slit between the back wall 222 and the cover proper 4. In this case, the external appearance of the cover 4 is improved. Furthermore, if desired, a reinforcing annular ridge may be formed on the cover proper 4 in a manner to link the spring holders 22. With this, the robust construction of each spring holder 22 is much assured, and the mechanical strength of the cover proper 4 is increased. Upon assembly, the ring spring 3 is put into the slit 128 of the catching pawl 12 and into the slits (no numerals) of the spring holder 22 of each latching unit, so that the head portions 121 of the catching pawls 12 are biased radially outwardly. Similar to the afore-mentioned first embodiment, attachment of the plastic wheel cover 4 to the wheel (viz., wheel rim) is simply achieved by pressing the cover 4 against the wheel with a certain force. This will be understood from FIG. 7. Designated by reference "S" in this drawing is the direction in which a slidable molding die is to be displaced upon die releasing. Such diagonal displacement of the die is necessary when a bead 41 is to be formed on the peripheral portion of the cover proper 4.

In the following, advantages of the second embodiment will be described.

First, since the catching pawl 12 is integral with the back wall 222 of the spring holder 22, any vibration applied to the catching pawl 12 is transmitted to the back wall 222 which has a considerable flexibility. Thus, such vibration is absorbed by the back wall 222. This phenomenon prevents the catching pawl 12 from a fatigue failure.

Second, due to the integral connection between the catching pawl 12 and the back wall 222, the catching pawl 12 has a flexibility in a direction parallel with the axis of the wheel rim 5. The flexibility prevents disconnection of the cover 4 from the wheel rim 5 even when there occurs a collision of the catching pawl 12 against the wheel disc 50 (see FIG. 7) during cruising of the associated motor vehicle.

Third, because the ring spring 3 is received in the different types of slits (viz., the slit 128 of the catching pawl 12 and the slits of the spring holder 22) in the above-mentioned manner, the ring spring 3 is assuredly held by the latching units. This brings about easy and reliable fitting of the cover 4 to the corresponding wheel rim.

Fourth, since the slits of the side walls 221 and 221 are inclined in a direction to allow expansion of the ring spring 3, the engagement between the ring spring 3 and each latching unit is much assured.

Referring to FIGS. 8 to 10, there is shown a plastic wheel cover 4 of a third embodiment of the present invention.

In the third embodiment, four latching units which are the same as those of the first embodiment and one specified latching unit 8 are employed. A ring spring 32 used in the third embodiment has opposed ends 320 as shown in FIG. 9. That is, as is seen from FIG. 8, the same latching units (each including the catching pawl 1 and the spring holder 2) and the specified latching unit 8 are circularly arranged on the cover proper 4. The specified latching unit 8 is constructed to incorporate with the opposed ends 320 of the ring spring 32. That is, the latching unit 8 is located at a position diametrically opposed to the portion where the air valve aperture 7 is provided.

The latching unit 8 comprises generally a catching pawl 81 and a spring holder 82.

The catching pawl 81 comprises generally an enlarged head portion 811 having a smoothly curved upper surface 812 formed thereon, and a resiliently deformable stay portion 813 extending from the cover proper 4 to the head portion 811. The head portion 811 is formed with two aligned slits 815 and 815 which are bounded by a partition wall 814.

The spring holder 82 comprises spaced side walls 821 and 821 and a back wall 822. Each side wall 821 is formed at its upper portion a slit 823 to which the slit 815 of the catching pawl 81 is exposed. Designated by numeral 820 is a bridge portion which is defined above the slit 823 of each side wall 821. For formation of the slit 823, a known sliding die and core type die are used during molding of the cover 4.

The ring spring 32 is put into the slits of the spring holders 2 of the same latching units having both ends 320 thereof put through the slits 823 and 823 of the spring holder 82 into the aligned slits 815 and 815 of the catching pawl 81. Thus, upon assembly, the catching pawls 1 of the same latching units and the catching pawl 81 of the specified latching unit are all biased radially outwardly by the ring spring 32. Attachment of the wheel cover 4 of this third embodiment to the corresponding wheel is achieved in the same manner as has been described hereinabove.

In the following, advantages of the third embodiment will be described.

First, since there is no need of welding the both ends 320 of the ring spring 320, the ring spring 32 is prevented from suffering heat deterioration caused by the heat generated upon welding. Furthermore, no necessity of the welding means a reduction in production steps.

Second, the bridge portion 820 brings about a robust construction of each side wall 821 by which the ring spring 32 is held.

Referring to FIGS. 11 and 12, there is shown a fourth embodiment of the present invention. The plastic wheel cover of this fourth embodiment is substantially the same as that of the above-mentioned third embodiment except for the specified latching unit and the ring spring. That is, in the fourth embodiment, the opposed ends 331 of the ring spring 33 are bent at generally right angles as shown.

The specified latching unit 8 comprises a catching pawl 83 and a spring holder 84. The catching pawl 83 comprises an enlarged head portion having a smoothly curved upper surface formed thereon, and a resiliently deformable stay portion extending from the cover proper 4 to the head portion. The head portion is formed with a through slit 831 which has a curvature corresponding to that of the ring spring 33. The mouth portion of the slit 831 is tapered at 833 for easy insertion of the ring spring 33 into the slit 831. The head portion of the catching pawl 83 further has at a generally middle portion thereof a recess 832 which is exposed to the slit 831, as shown. The recess 832 is so sized to receive the bent end portions 331 of the ring spring 33.

The spring holder 84 comprises spaced side walls and a back wall. Each side wall is formed at its top with a head 840 leaving an inclined slit (no numeral) therebetween.

Upon requirement of assembly, the ring spring 33 is put into the slits of the spring holders 2 of the same latching units and at the same time the ring spring 33 is put into the inclined slits of the spring holder 84 of the specified latch unit 8 having the opposed bent ends 331 thereof put into the recess 832.

Substantially the same advantages as those of the third embodiment are achieved from this fourth embodiment. Besides, fitting the ends 331 of the ring spring 33 to the specified latching unit 8 is easily made as compared with the case of the third embodiment. Because the bent ends 331 of the ring spring 33 are caught by the recess 832 in a so-called latched manner, there is no tendency of disconnection of the ring spring 33 from the latching unit 8 even when the cover 4 is handled roughly. Furthermore, due to the reason which has been described hereinabove, the width "W" of the latching unit 8 can be reduced.

Referring to FIGS. 13 to 15, there is shown a fifth embodiment of the present invention. The plastic wheel cover of this fifth embodiment is substantially the same as that of the afore-mentioned first embodiment except the following.

That is, in the fifth embodiment, a ring spring 34 having ends 340 is used and two specified latching units 9 and 9 are used.

As is seen from FIG. 15, the two units 9 and 9 are identical in construction and arranged to put therebetween an air valve receiving aperture 7 of the cover proper 4. Each unit 9 comprises a catching pawl 91 and a spring holder 92.

The catching pawl 91 comprises an enlarged head portion 911 having a slit 913 formed therein, and a resiliently deformable stay portion extending downwardly from the head portion 911. The mouth portion of the slit 913 is tapered at 912 for facilitating insertion of the ring spring 34 into the slit 913.

The spring holder 92 comprises a side wall 921 and a back wall 922. As shown, the stay portion of the catching pawl 91 is integrally connected to the back wall 922 of the spring holder 92. The side wall 921 is formed at its top with a head 920 leaving a slit (no numeral) therebetween.

Upon requirement of assembly, the ring spring 34 is put into the slits of the spring holders 2 of the same latching units having the both ends 340 thereof put through the respective slits of the side walls 921 and 921 of the two units 9 and 9 into the slits 913 and 913 of the same. Thus, upon assembly, the catching pawls 1 of the same latching units and the catching pawls 91 and 91 of the specified latching units 9 and 9 are all biased radially outwardly by the ring spring 32.

If desired, another slit 913' may be formed in the head portion 911 of the catching pawl 91. In this case, both ends 340' (only one is shown) of the ring spring 34 are bent at generally right angles.

In the fifth embodiment, there is no trouble as to interference with an air valve of the associated wheel which is passed through the aperture 7.

Referring to FIGS. 16 and 17, there is shown a sixth embodiment of the present invention.

The plastic wheel cover of this sixth embodiment is substantially the same as that of the fifth embodiment except the specified latching units 9 and 9.

That is, each latching unit 9 employed in the sixth embodiment comprises a catching pawl 93 and a spring holder 94 which have the following constructions.

The catching pawl 93 has the same construction as the catching pawl 12 (see FIG. 6) of the second embodiment. The spring holder 94 comprises spaced side walls 941 and 942 arranged to put therebetween the catching pawl 93, and a back wall 943 extending between the side walls 941 and 942. The side wall 942 remote from the air valve aperture 7 is formed with a slot (no numeral) above which a bridge portion is defined, while, the other side wall 941 near the valve aperture 7 is formed at its upper part with a slot 944. The slot 944 has a stepped portion 944' which faces toward the catching pawl 93.

As is seen from FIG. 16, each end portion of the ring spring 34 is passed through the slot of the remote side wall 942 and put into the slit of the catching pawl 93, and the terminal end 340 of the ring spring 34 is slidably received in the stepped portion 944'.

Because, in the sixth embodiment, the terminal ends of the ring spring 34 are slidably held by the side walls 941 of the latching units 9 and 9, the biasing force of the ring spring 34 is stably applied to the catching pawls 93 and 93 of the units 9 and 9.

Referring to FIGS. 18 to 22, there is shown a seventh embodiment of the present invention.

The plastic wheel cover 4 of this seventh embodiment is similar to that of the afore-mentioned second embodiment except the following.

Figure 22:
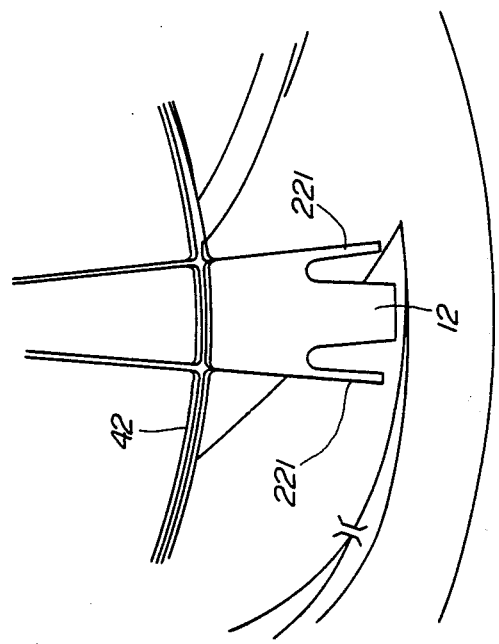
Figure 21:
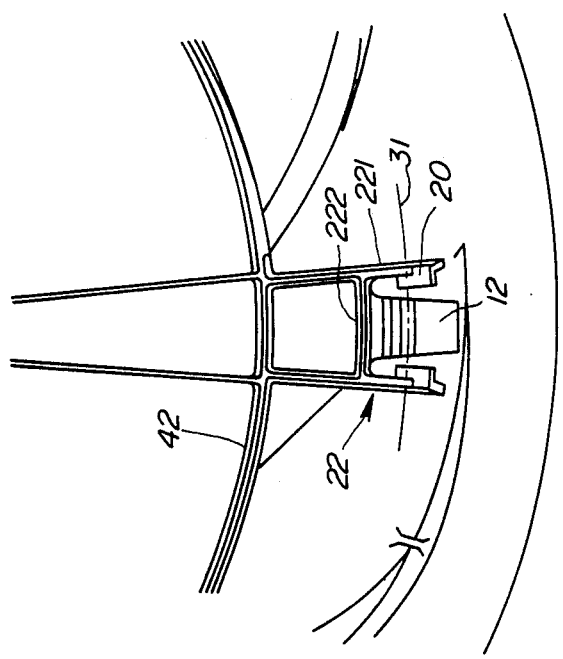

That is, as is seen from FIG. 18, each latching unit 9 comprises a catching pawl 12 and a spring holder 22 which have substantially the same constructions as the latching unit of the second embodiment (see FIGS. 6 and 7). In the seventh embodiment, however, the side walls 221 of the spring holder 22 have integral extensions 220 and 220 which extend radially inwardly. The extensions 220 and 220 are integrally connected at their inward ends to an annular wall 42 which is integrally and concentrically formed on the cover proper 4. As is seen from FIGS. 19 and 20, the outer decorative surface of the cover proper 4 is formed with an annular step 44 which extends circularly along the the annular wall 42. As is shown in FIGS. 21 and 22, if desired, the side walls 221 and 221 of the spring holder 22 may extend diametrically of the cover proper 4.

With the construction, the seventh embodiment has the following advantages.

First, because of provision of the annular wall 42 and the extensions 220 and 220 which serve as a reinforcing structure, the mechanical strength of each latching unit is considerably increased.

Second, because of provision of the above-mentioned reinforcing structure, the rigidity of the peripheral portion of the cover proper 4 is increased. This brings about an intimate contact between the outer periphery 41 of the cover proper 4 and the outer edge 59 of the wheel rim 5.

Third, because of the increased rigidity of the cover proper 4, the same can be formed with many ventilation openings 43 (see FIG. 20) through which heat generated upon braking of the associated wheel escapes into the open air.

Referring to FIGS. 23 to 25, there is shown a eighth embodiment of the present invention.

A plurality of latching units are circularly arranged on the peripheral portion of the cover proper 4. Terminal two of them are arranged to put therebetween an air valve receiving aperture 7 of the cover proper 4. Similar to the above-mentioned embodiments, each latching unit comprises a catching pawl 13 and a spring holder 23 which are integrally formed on the cover proper 4.

As is seen from FIG. 23, the catching pawl 23 comprises generally an enlarged head portion 131 having a smoothly curved upper surface formed thereon, and a resiliently deformable stay portion extending downwardly from the head portion 131.

The spring holder 23 comprises two spaced side walls, a back wall extending between the side walls and a bridge portion 14 extending between front portions of the side walls. As shown, the stay portion of the catching pawl 23 extends from a middle part of the bridge portion 14, and a considerable space 24 is defined between the bridge portion 14 and the cover proper 4. Similar to the afore-mentioned first embodiment, each side wall of the spring holder 23 is formed at its top with a head 20 leaving a slit therebetween.

The metal ring spring 34 used in this embodiment has terminal ends 340 and 340. As shown in FIG. 23, the terminal ends 340 and 340 are connected through a U-shaped flap member 35. That is, two arm portions of the flap member 35 are welded to the terminal ends 340 and 340 respectively. As is seen from FIG. 25, the air valve receiving aperture 7 of the cover proper 4 is formed with an inwardly projected hedge 71. In order to avoid interference with the hedge 71, the U-shaped flap member 35 of the ring spring 34 has three parts 350, 350 and 351 bent outwardly.

Upon requirement of assembly, the ring spring 34 is contracted and put into the slits of the spring holders 23 having the U-shaped flap member 35 placed over the valve aperture 7 of the cover proper 4, as is understood from FIG. 23. Thus, upon assembly, the catching pawls 13 of the latching units are biased radially outwardly by the ring spring 34.

The fitting of the wheel cover 4 to the corresponding wheel is readily achieved by carrying out the aforementioned fitting procedure.

In the following, advantages of the eighth embodiment will be described.

First, because the catching pawl 13 extends from the bridge portion 14 which is constructed to allow a considerable flexibility thereof relative to the fixed side walls, the resilient deformability of the catching pawl 13 is improved thereby assuring the latching engagement between the catching pawl 13 and the wheel rim 5 as is seen from FIG. 24. Designated by numeral 6 in FIGS. 24 and 25 is a wheel balancer fixed to the wheel rim 5.

Second, because of provision of the bridge portion 14, the catching pawl 13 has a flexibility in a direction parallel with the axis of the wheel rim 5. This flexibility prevents disconnection of the cover 4 from the wheel rim 5 even when there occurs a collision of the catching pawl 13 against the well of the wheel rim 5 during cruising of a motor vehicle.

Third, since the catching pawl 13 is integral with the bridge portion 14, any vibration applied to the catching pawl 13 is transmitted to the cover proper 4 through the bridge portion 14. This phenomenon prevents the catching pawl 13 from a fatigue failure.

If desired, the U-shaped flap member 35 may be so sized as to be snugly received between the terminal latching units as shown in FIG. 23. With this, undesired turning displacement of the ring spring 34 is suppressed.

In the following, an advantageous operation of the fastening device of the above-mentioned eighth embodiment will be described with reference to FIGS. 26A to 26C. For ease of understanding, the other two fastening devices are also outlined. FIG. 26A shows a condition wherein the fitting step of the plastic wheel cover 4 to the wheel rim 5 begins, FIG. 26B shows a condition wherein the plastic wheel cover 4 is about to be fitted to the wheel rim 5 and FIG. 26C shows a condition wherein the catching pawl on the plastic wheel cover 4 collides against the well of the wheel rim 5. In each drawing, the view denoted by reference "x" shows the eighth embodiment, the view denoted by reference "y" shows an example wherein the catching pawl extends from the cover proper, and the view denoted by reference "z" shows an example wherein the catching pawl extends from the back wall of the spring holder.

As is seen from FIG. 26A, the catching pawls 13, 1 and 12 have at different portions, pivot axes "O", "O'" and "O''" about which the pawls pivot. That is, the inclination tendencies of the catching pawls 13, 1 and 12 change when the pivoting axes are located at different portions. In the eighth embodiment, the catching pawl 13 tends to incline inwardly at the initial step of the cover fitting procedure, while in the other two fastening devices, the catching pawl 1 or 12 tends to incline outwardly at such initial step. This means that in this initial stage, the catching pawl 13 of the eighth embodiment shows an appropriate action for achieving a reliable and speedy engagement between the cover 4 and the wheel rim 5. As is seen from FIG. 26B, when the head portion 131, 111 or 121 of the catching pawl 13, 1 or 12 is sliding on the annular bank portion 52 of the wheel rim 5, the inward movement of the catching pawl is carried out without being affected by the inclination tendency of the catching pawl.

As is seen from FIG. 26C, during cruising of the motor vehicle, it sometimes occurs that the head portion 131, 111 or 121 of the catching pawl 13, 1 or 12 collides against the well (no numeral) of the wheel rim 5. In the example of "y", such collision directly brings about an outward displacement of the outer peripheral portion of the cover proper 4, as is shown by a phantom line 4' in FIG. 26C-y. This causes the undesired disconnection of the cover 4 from the wheel rim 5 during cruising of the vehicle. While, in the other two arrangements "x" and "z", particularly in the fastening device "x" of the eighth embodiment, such collision is appropriately absorbed by the bridge portion 14 of the spring holder. Thus, the disconnection of the cover 4 does not occur.

Figure 27:
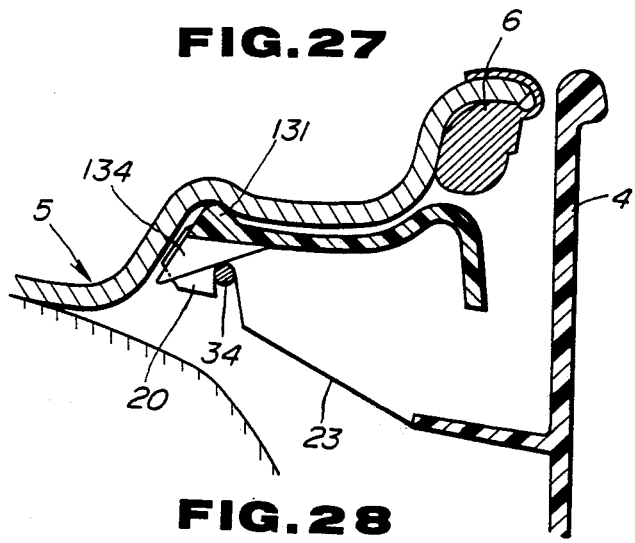
Figure 28:
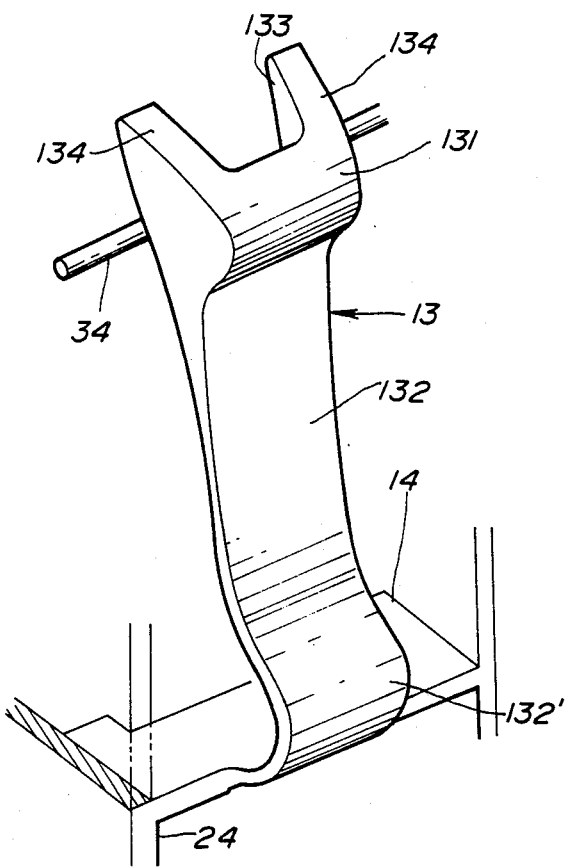

Referring to FIGS. 27 and 28, there is shown a ninth embodiment of the present invention.

As is seen from the drawings, the ninth embodiment is a slight modification of the above-mentioned eighth embodiment. Thus, only portions different from those of the eighth embodiment will be described in the following.

As is seen from FIG. 28, the stay portion 132 of the catching pawl 13 extends from an outer edge of the bridge portion 14 of the spring holder 23. The shank portion 132' of the stay portion 132 is rounded outwardly. Furthermore, the head portion 131 of the catching pawl 13 is formed with a rectangular recess 133. Thus, two libs 134 and 134 are provided on the head portion 131. For the purpose which will be clarified hereinafter, upon assembly, the leading ends of the two libs 134 and 134 are placed nearer the axis of the cover proper 4 than the ring spring 34.

In the following, advantages of this ninth embodiment will be described.

First, because the catching pawl 13 extends from the outer edge of the bridge portion 14 of the spring holder 23, the same can have a desired inclination tendency. The reason of this may be understood from the description on the advantages of the eighth embodiment.

Second, because the catching pawl 13 has at the stay portion 132 the rounded portion 132', the same can have a sufficient flexibility in not only a direction perpendicular to the axis of the cover proper 4 but also a direction parallel with the axis. Thus, the undesired disconnection of the cover 4 from the wheel rim 5 does not occur.

Third, because the head portion 131 of the catching pawl 13 is formed with the recess 133, the same can be molded thin. Thus, the catching pawl can be produced without creases.

Figure 29:
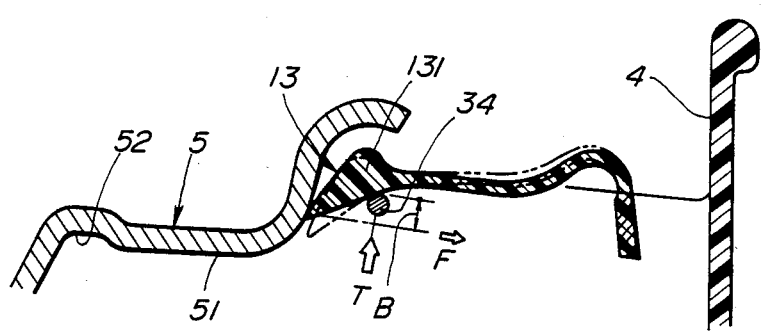

In the following, advantageous operations of the ninth and eighth embodiments will be described with reference to FIGS. 29 and 30 which show a condition wherein the fitting step of the cover 4 to the wheel rim 5 begins. FIG. 29 shows the ninth embodiment, while, FIG. 30 shows the eighth embodiment.

Usually, upon requirement of the cover fitting, the cover 4 is coaxially put on the wheel rim 5 having the air valve receiving aperture 7 mated with the air valve of the wheel, and then one side of the cover 4 is pressed against the wheel rim 5. After this, a diametrically opposite side of the cover 4 is pressed to achieve a full engagement of the cover 4 to the wheel rim 5. Thus, during this cover fitting procedure, it inevitably occurs that, as is shown in FIGS. 29 and 30, at least one catching pawl 13 of the latching unit is left behind the annular bank 51 of the wheel rim 5. The subsequent pressing of the cover 4 induces the following results.

In the ninth embodiment of FIG. 29, the subsequent pressing causes the head portion 131 to slide toward the annular bank 51. This is because the leading end of the head portion 131 extends inwardly beyond the ring spring 34. That is, when, with the catching pawl 13 pressed by the ring spring 34 by the force of "T", the cover 4 is pressed toward the wheel rim 5, the counterforce "f" produced by the catching pawl 13 allows the catching pawl 13 to have a moment in a counterclockwise direction. Thus, as is shown by the phantom line, the catching pawl 13 flexes in a manner to promote the movement thereof toward the annular bank 51. It is to be noted that reference "B" denotes the gap between the leading end of the head portion 131 and the portion of the same to which the ring spring 34 contacts.

Figure 30:
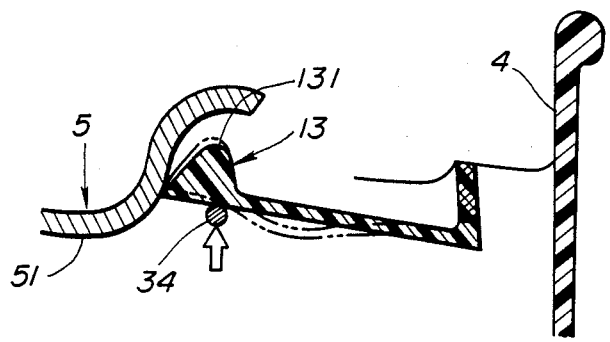

In the eighth embodiment of FIG. 30, the above-mentioned desired moment is not produced in the catching pawl 13. In other words, under the above-mentioned condition, the catching pawl 13 tends to have a moment in a clockwise direction as is shown by the phantom line in the drawing. Thus, the desirable movement of the catching pawl 13 is not expected from this eighth embodiment.

It is to be noted that the above-mentioned advantageous movement of the catching pawl 13 is also expected from a structure wherein the catching pawl 13 extends directly from the cover proper 4 so long as the leading end of the head portion of the pawl extends inwardly beyond the ring spring 34.

Figure 31:
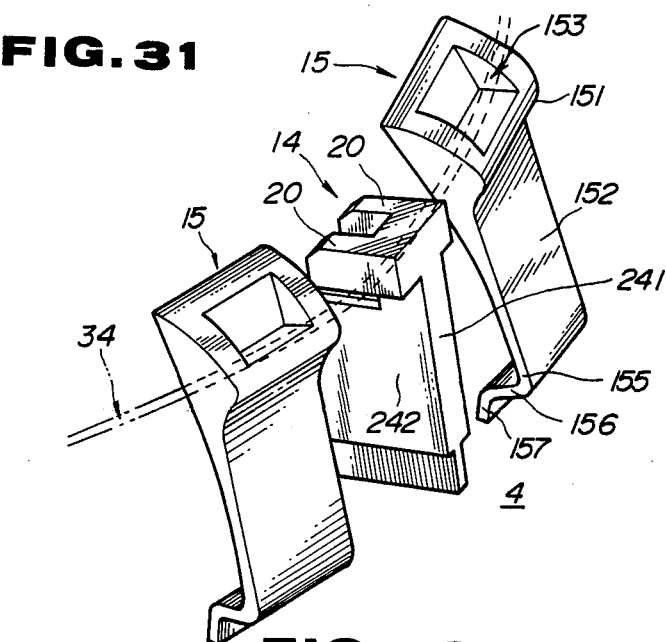
Figure 32:
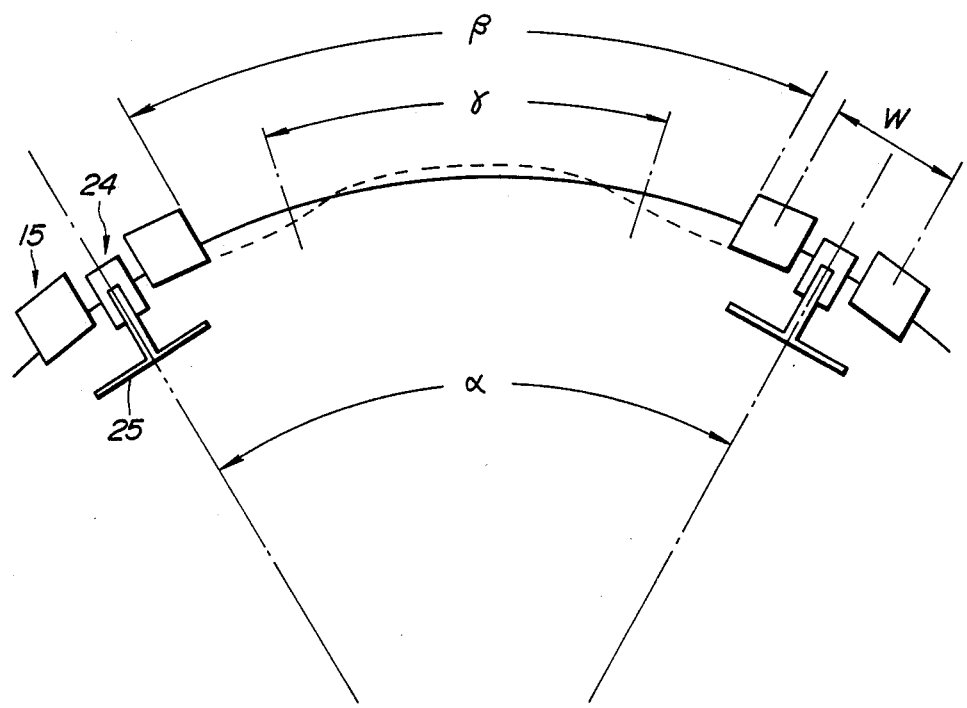

Referring to FIGS. 31 and 32, there is shown a tenth embodiment of the present invention.

As is seen from FIG. 31, the latching unit employed in this embodiment comprises two catching pawls 15 and one spring holder 24 which is arranged between the catching pawls 15 as shown. Each catching pawl 15 extends from a cover proper 4 and comprises a head portion 151, a stay portion 152 and a bent portion (155, 156 and 157). The bent portion has a generally S-shaped cross section. The head portion 151 is formed with a rectangular recess 153. The spring holder 24 comprises a base portion 242, two head portions 20 and a supporting wall 25 (see FIG. 32) of generally T-shaped cross section. In order to mold the plastic wheel cover 4 of this embodiment, slidable molding dies are used. Providing the catching pawl 15 with the bent portion (155, 156 and 157) facilitates the mold removing as compared with the ninth embodiment of FIG. 28 because of a higher flexibility exhibited by the bent portion.

The ring spring 34 is put into a slit (no numeral) formed in the base portion 242 of the spring holder 24, pressing the back surfaces of the catching pawls 15 radially outwardly.

Advantage of this tenth embodiment becomes markable when the number of the latching units is relatively small (for example five). This will be described with reference to FIG. 32.

Assuming that the number of the latching units is N, the biasing force produced by the ring spring 34 is proportional to the cube of N when the maximum stress of the ring spring is constant. This is because when the mean angular distance α (alpha) between the adjacent two latching units is increased increasing the span between the catching pawls, the deflection degree of the ring spring becomes great. However, in the tenth embodiment wherein two catching pawls are employed in each latching unit, the angular distance α is decreased by a degree corresponding to the distance W between the two catching pawls. Thus, the apparent span of the adjacent latching units becomes β. In addition, since the ring spring is forced to have a waved structure as shown, the effective span γ becomes considerably small. Thus, the elastic energy of the ring spring is effectively used for biasing the catching pawls of the latching units.

In the following, ring springs usable in the present invention will be described with reference to FIGS. 33 to 41.

Figure 33:
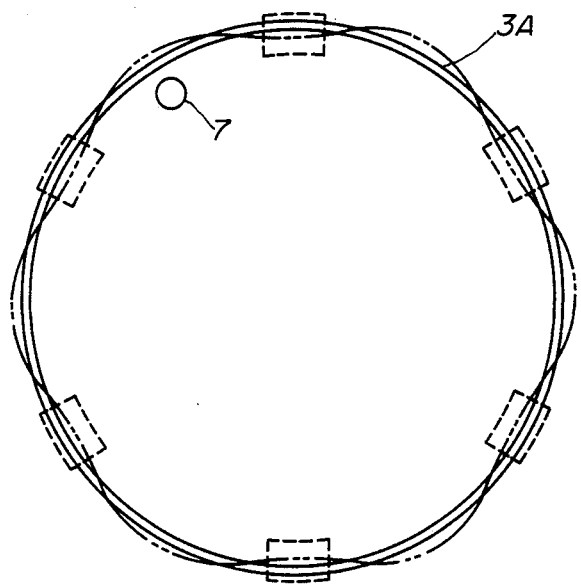
FIGS. 33 and 34 are plan views of ring springs which are constructed of a metal.
Figure 34:
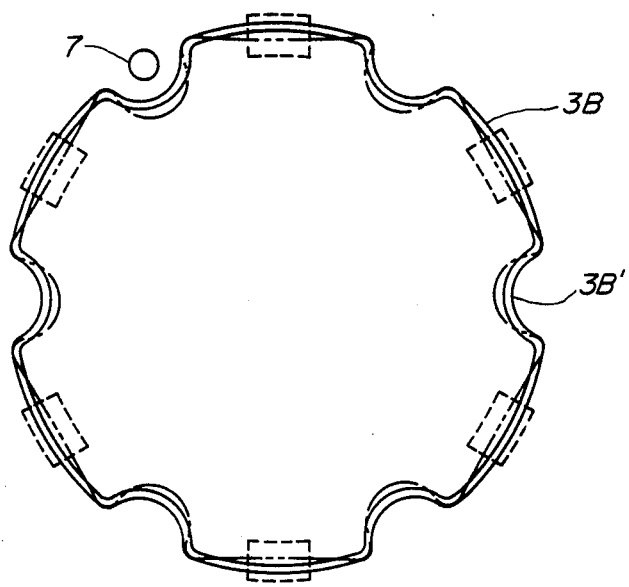
Figure 35:
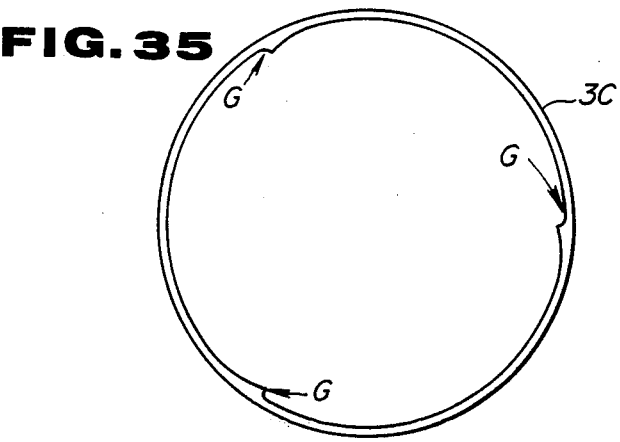
FIGS. 35 to 37 are plan views of ring springs which are constructed of a fiber-reinforced plastic.
Figure 36:
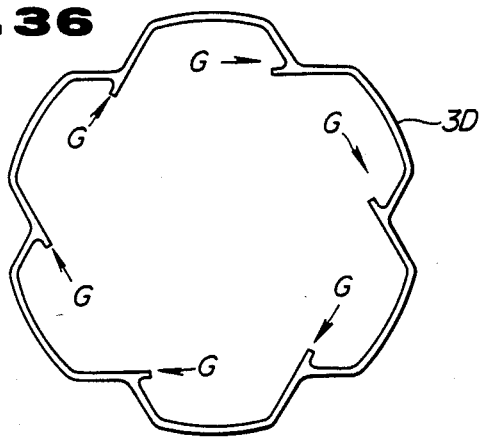
Figure 37:
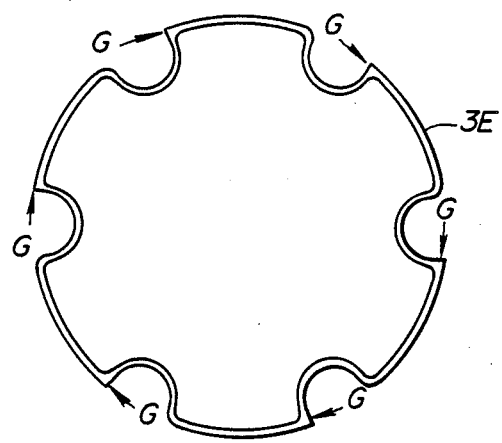
Figure 38:
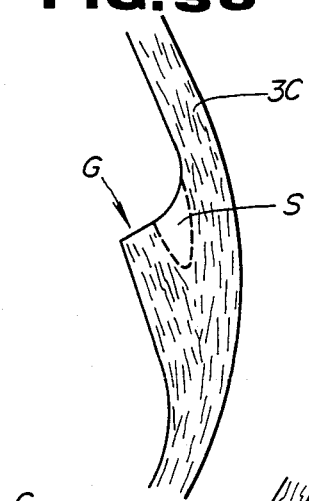
FIGS. 38 to 40 are enlarged views of essential parts of the ring springs of FIGS. 35 to 37, respectively.
Figure 39:
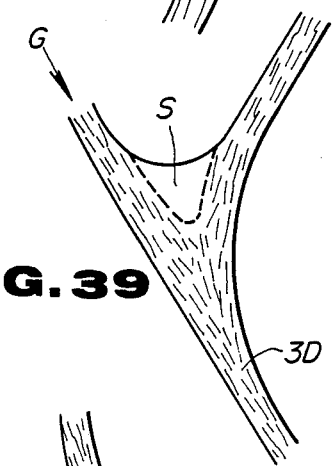
Figure 40:
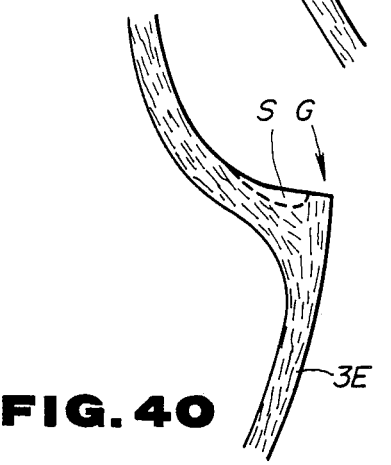
Figure 41A:
FIGS. 41A, 41B and 41C are sectional views of the ring springs of FIGS. 35 to 37, respectively.
Figure 41B:
Figure 41C:

FIGS. 33 and 34 show plan views of endless ring springs constructed of a metal, while, FIGS. 35 to 37 show plan views of endless ring springs constructed of a fiber-reinforced plastic. If desired, the rings springs may be constructed of a liquid-crystal polymer. The portion denoted by reference "G" in the drawings is the part which was located in a gate of a corresponding molding die. FIGS. 38 to 40 are enlarged views of the gate portions of the endless ring springs of FIGS. 35 to 37 respectively. FIGS. 41A, 41B and 41C are enlarged sectional views of the endless ring springs of FIGS. 35 to 37 respectively.

The metal ring spring 3A of FIG. 33 is the most simple in construction. In the drawing, the ring spring 3A is illustrated to associate with a fastening device of a plastic wheel cover having six latching units. When the ring spring 3A is properly set in the fastening device of the cover 4, the same assumes the condition as illustrated by a phantom line. The spring 3A can be produced with a reduced cost. In fact, as will be described hereinafter, this type spring can be produced in a mass production scale from a coiled resilient metal wire. That is, the coiled wire is cut at one side along the axis thereof, and then opposed ends of neighbourhood cut rings are welded. As is known, the rounded metal ring spring 3A has a relatively high spring constant and a non-linear characteristics in the relation between a load applied thereto and a flexible degree thereof.

The metal ring spring 3B of FIG. 34 is formed with six equally spaced inwardly protruded portions 3B'. Upon assembly, the ring spring 3B gets out of the air valve receiving aperture 7 of the cover proper 4 at one of the protruded portions 3B', as shown. When the ring 3B is properly set in the fastening device of the cover 4, the same assumes the condition as shown by a phantom line. The spring constant of this ring spring 3B is small as compared with the rounded ring spring 3A.

Plastic ring springs 3C, 3D and 3E shown in FIGS. 35, 36 and 37 are constructed by a fiber-reinforced thermoplastic resin. Preferably, the fibers contained in the resin are of a long fiber type (viz., several mm in length). As is seen from FIGS. 38, 39 and 40, the long fibers are oriented in parallel in such a direction that the fluidized plastic material has flowed. As is seen from FIGS. 35 to 37, for molding the plastic ring springs 3C, 3D and 3E, molding dies are assembled having gates "G" arranged symmetrically and spaced equally. This arrangement of the gates brings about a homogeneous structure of the ring spring 3C, 3D or 3E. Designated by reference "S" is a triangular part which is produced near the gate portion. The triangular part "S" functions to relax the stress which is produced when the ring spring is largely flexed. Usually, the triangular part "S" contains a less amount of fibers. As is seen from FIGS. 41A, 41B and 41C, the plastic ring springs 3C, 3D and 3E can have various shapes in cross section.

Figure 42A:
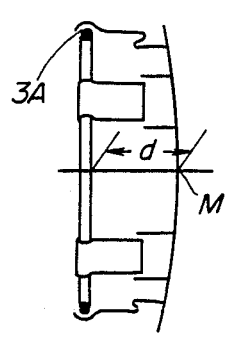
FIGS. 42A to 42C are schematically illustrated side sectional views of the plastic wheel cover of the present invention, showing the conditions of the ring spring and the cover proper when a shock is applied thereto.
Figure 42B:
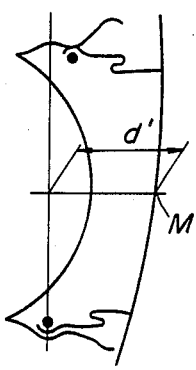
Figure 42C:
Figure 43A:
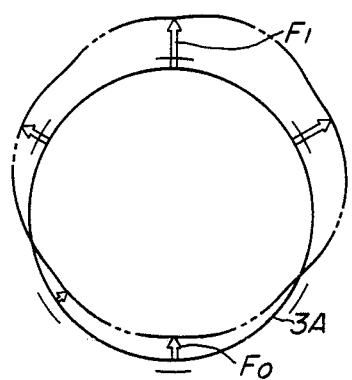
FIGS. 43A to 43C are back views of the plastic wheel cover of the present invention, showing the conditions of the ring spring and the cover proper when a shock is applied thereto.
Figure 43B:
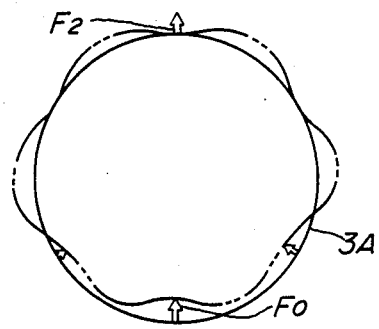
Figure 43C:
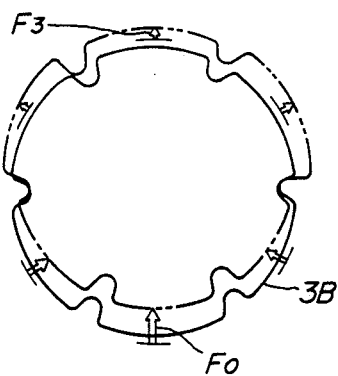

In the following, advantageous operations of the afore-mentioned metal ring springs 3A and 3B of FIGS. 33 and 34 will be described with reference to FIGS. 42A, 43A, 42B, 43B, 42C and 43C. For ease of understanding, one reference example will be also described. FIGS. 42A, 42B and 42C are schematically illustrated sectional views of the fastening devices on the given plastic wheel covers, while, FIGS. 43A, 43B and 43C are schematically illustrated plan views of the ring springs on the fastening devices. The description is directed to an arrangement wherein the spring holders of such type as shown in FIGS. 6 and 7 (viz., second embodiment) are used.

FIGS. 42A and 43A are drawings showing a case wherein the rounded metal spring 3A is properly set in the spring holders 22. FIGS. 42B and 43B are drawings showing a case wherein the rounded metal spring 3A is set in the spring holders in such a manner that the metal spring 3A is unmovably connected to each of the catching pawls 12 and FIGS. 42C and 43C are drawings showing a case wherein the daisy-like metal spring 3A is properly set in the spring holders 22.

When, due to running of a motor vehicle over a gap of a road, a big stress is applied to the wheel cover, the wheel cover is applied with a certain torque, after a given time, in a direction to pivot outwardly about a lower portion thereof held by a lower-positioned latching unit. The given time is determined by the mass of the wheel cover and the resiliency of the catching pawls promoted by the ring spring. The torque is determined by the product of the distance "d" between the center "M" of gravity of the wheel cover and the wheel rim and the impact acceleration. Thus, if, under this condition, the gripping force produced by an upper-positioned latching unit (more specifically, the product by the friction coefficient and the effective distance between the adjacent latching units) is greater than the torque, the undesired disconnection of the wheel cover from the wheel rim is avoided.

As is seen from FIG. 43A which shows the case of using the rounded metal ring spring 3A, when an impact force "F0" is applied to the ring spring 3A, the spring 3A shows the greatest deflection at its upper part because the deflection of the same is easily carried out due to the rounded shape of the spring. Thus, a great gripping force "F1" is produced by the upper latching units thereby suppressing the undesired disconnection of the wheel cover.

However, in the arrangement of FIGS. 42B and 43B which has the rounded metal ring spring 3A unmovably connected to the catching pawls, the deflection is concentrated at the portions between the evely neighbouring latching units. Thus, the above-mentioned advantageous operation of the ring spring 3A is not expected from this case. That is, the gripping force "F2" produced by the upper latching units is small.

In the arrangement of FIGS. 42C and 43C which has the daisy-like metal ring spring 3B properly set in the spring holders 22, substantially the same operation as that of FIGS. 42A and 43A is carried out. However, the gripping force "F3" produced by the upper latching units is somewhat smaller than the force "F1" because of the reduced resiliency caused by the provision of the protruded portions. However, the reduced resiliency of the ring spring 3B can increase the afore-mentioned given time (viz., time delay). Experiment has revealed that when the resonance frequency of the wheel cover, which is determined by the mass of the cover and the resiliency of the catching pawls, is small, increase in time delay becomes effective in suppressing the disconnection of the cover from the wheel rim.

As is seen from FIG. 42B, when the wheel cover is displaced somewhat from its fully engaged position relative to the wheel rim, the distance "d'" between the center "M" of gravity of the wheel cover and the wheel rim is increased thereby increasing the torque in a direction to pull the cover from the wheel rim. Thus, it is important to increase the gripping force produced by the latching units.

Advantages of metal ring springs of such type as shown in FIG. 23 (eighth embodiment) will be described with reference to FIGS. 48 to 51. For ease of understanding of the advantages, description on a conventional metal ring spring as shown in FIGS. 44 to 47 will be commenced in the following.

Referring to FIGS. 44 to 47, particularly FIG. 44, there is shown the conventional metal ring spring 39. The ring spring 39 has a flap portion 392 which is constructed by protruding a part thereof in one direction as shown. The flap portion 392 is provided for avoiding interference with an air valve (not shown) projected from the wheel rim of a wheel. The length "H" of the flap portion 392 can not be reduced so much because the flat must avoid the air valve. However, when the length "H" is increased, the bending moment "M" (=F×H) produced by the counterforce "F" of the catching pawls of the associated latching units is also increased. However, the increase in the bending moment means increase in displacement "S" of the flap portion 392 toward the air valve. This displacement causes creation of unsightly creases around the air valve receiving aperture of the wheel cover thereby deteriorating the external appearance of the wheel cover. Furthermore, the counterforce "F" of the catching pawls causes increased torsional stress "T" applied to the flap portion 392 thereby causing a radially outward expansion "e" of the flap portion 392 and its neighbourhood. As may be understood, this expansion induces uneven pressing forces produced by the catching pawls of the latching units. Denoted by numeral 393 is a connector by which opposed ends of the ring spring 39 are connected.

Referring to FIGS. 48 to 51, there is shown the metal ring spring 34 which is free of the above-mentioned drawbacks. As shown, opposed ends of the metal ring spring 34 are connected through a generally U-shaped metal flap member 341. That is, the opposed ends of the ring spring 34 are respectively welded to arm portions of the flap member 341. Because the metal flap member 341 has a considerable rigidity as compared with the flap portion 392 of the conventional ring spring 39, the above-mentioned displacement "S" and expansion "e" are small. As is known, the rigidity of the flap member 341 depends on the height "H2" and width "H3" of the same. Accordingly, even pressing forces are produced by the catching pawls of the latching units.

Figure 52:
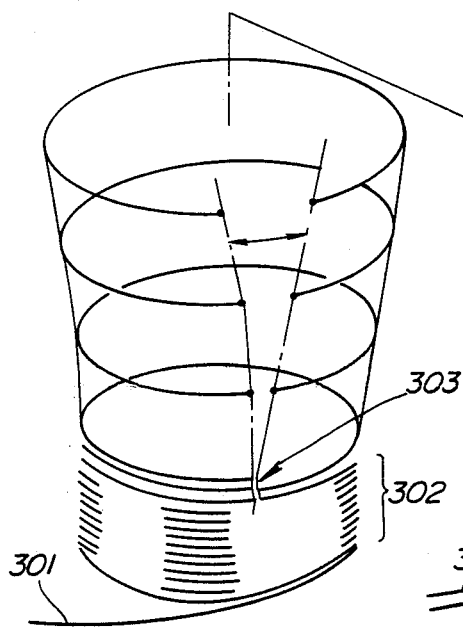
FIGS. 52 and 53 are illustrations showing the method of producing metal ring springs employable in the invention.
Figure 53:
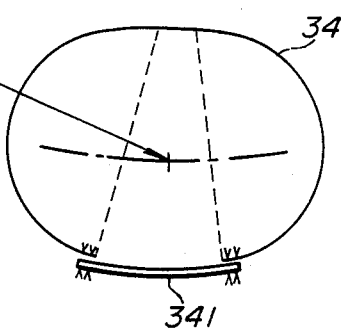

FIGS. 52 and 53 show a method of producing metal ring springs. First, a wire member 301 is looped to form a coil 302. Then, each loop is cut at one portion 303. With this, a ring spring having opposed ends is produced. When the opposed ends are welled, a rounded ring spring is produced. While, as is shown in FIG. 53, when the opposed ends are connected through a metal flap member 341, the metal ring spring like the spring 34 of FIG. 48 is produced. In order to increase the resiliency of the ring spring, the same is subjected to a heat treatment in a known manner.

Figure 54:
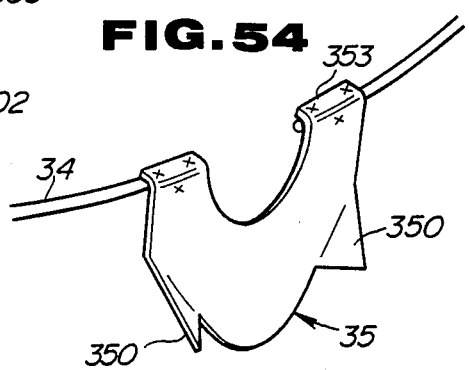
FIGS. 54 and 55 are drawings showing a modification of the metal ring spring.
Figure 56:
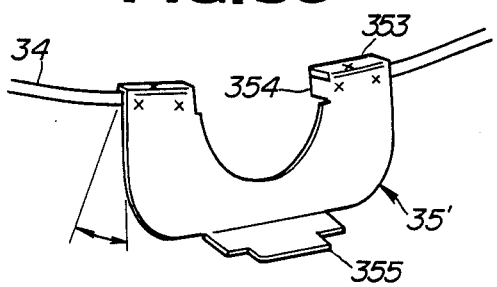
FIGS. 56 and 57 are drawings showing the other modifications of the metal ring spring.
Figure 57:
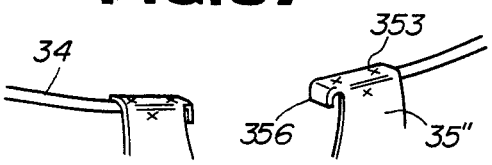

FIGS. 54, 56 and 57 show respectively three metal flap members 35, 35' and 35" which are used for connecting the opposed ends of the metal ring spring 34.

The metal flap member 35 shown in FIG. 54 is the same as that used in the eighth embodiment (see FIG.

Figure 55:
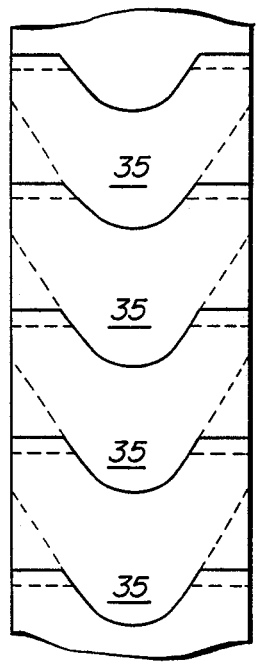

23). As shown, the leading end 353 of each arm portion is bent at generally right angles for ease of welding applied thereto. FIG. 55 shows a blank metal sheet from which the flap members 53 are to be punched out. As is seen from this drawing, the shape of the flap member 53 is very effective in increasing the useability of the blank metal sheet.

The metal flap member 35' shown in FIG. 56 is a slight modification of that shown in FIG. 54. As is seen from the drawing, the major part of the flat member 35' is formed, near the bent leading ends 353 of the arm portions, with lugs (no numerals) by which the opposed ends of the metal ring spring 34 are covered, as shown. Furthermore, the flat member 35' is formed at its lower part with a bent portion 355.

The metal flap member 35" of FIG. 57 is formed at the inward ends of the bent leading ends 353 with lugs 356 by which the opposed ends of the metal ring spring 34 are covered. With these additional parts 354, 355 and 356, the mechanical strength of the flap member 35' or 35" is increased and the connection between the flap member and the corresponding ring spring 34 is much assured.

What is claimed is:

1. A plastic wheel cover comprising:
   a cover proper constructed of a molded plastic;
   a plurality of latching units integrally and circularly arranged on one surface of said cover proper, each unit including a catching pawl extending perpendicularly away from said cover proper and a spring holder extending perpendicularly away from said cover proper at a position near the catching pawl; and
   a ring spring held by the spring holders in a manner to resiliently bias the catching pawls radially outwardly with respect to said cover proper;
   wherein each of said spring holders comprises:
   (a) a wall portion raised from said cover proper and extending in a radial direction with respect to said cover proper; and
   (b) a head portion located above said wall portion and integrally connected to said wall portion through a neck portion in a manner to define an inwardly facing slit between said head portion and said wall portion, said slit extending radially inwardly from a terminating point at said neck portion;
   said wall portion and said head portion being positioned away from each other in a circumferential direction with respect to said cover proper.

2. A plastic wheel cover as claimed in claim 1, in which said catching pawl comprises an enlarged head portion and a resiliently deformable stay portion which extends from said head portion toward said cover proper.

3. A plastic wheel cover as claimed in claim 2, in which said spring holder comprises a side wall located adjacent to said catching pawl and a back wall extending from said side wall.

4. A plastic wheel cover as claimed in claim 3, in which two of said latching units are arranged to put therebetween an air valve receiving aperture formed in said cover proper.

5. A plastic wheel cover as claimed in claim 4, in which said stay portion of said catching pawl is integral with said back wall of said spring holder.

6. A plastic wheel cover as claimed in claim 5, in which said head portion of said catching pawl is formed with a blind slit into which one of opposed ends of said ring spring is received.

7. A plastic wheel cover as claimed in claim 5, in which said head portion of said catching pawl is formed with a through slit into which one end portion said ring spring is received.

8. A plastic wheel cover as claimed in claim 7, in which a terminal end of said ring spring is slidably received in a groove formed in the other side wall of said spring holder.

9. A plastic wheel cover as claimed in claim 3, in which each of said latching units comprises two catching pawls and one spring holder, said spring holder being arranged between said two catching pawls.

10. A plastic wheel cover as claimed in claim 1, in which said ring spring is constructed of a metal wire.

11. A plastic wheel cover as claimed in claim 10, in which said ring spring is an endless ring spring.

12. A plastic wheel cover as claimed in claim 11, in which said ring spring is a rounded ring spring.

13. A plastic wheel cover as claimed in claim 11, in which said ring spring is formed with a plurality of outwardly protruded portions.

14. A plastic wheel cover as claimed in claim 10, in which said ring spring is a ring spring having opposed ends.

15. A plastic wheel cover as claimed in claim 14, in which said opposed ends of said ring spring is connected through a metal flap member.

16. A plastic wheel cover as claimed in claim 15, in which said metal flap member has two arm portions which the opposed ends of said metal ring are welded respectively.

17. A plastic wheel cover as claimed in claim 1, in which said ring spring is constructed of a fiber-reinforced plastic, and in which the plastic ring spring is of an endless ring spring.

18. A plastic wheel cover as claimed in claim 17, in which the plastic ring spring is formed with a plurality of outwardly protruded portions.

19. A plastic wheel cover as claimed in claim 17, in which the plastic ring spring is formed with a plurality of inwardly protruded portions.

20. A plastic wheel cover as claimed in claim 1, in which said ring spring is constructed of a liquid-crystal polymer.

21. A plastic wheel cover, comprising:
   a cover proper constructed of a molded plastic;
   a plurality of latching units integrally and circularly arranged on one surface of said cover proper, each unit including a catching pawl extending away from said cover proper and a spring holder located near the catching pawl; and
   a ring spring held by said spring holders in a manner to radially press back surfaces of said catching pawls thereby to resiliently bias the catch pawls radially outwardly with respect to said cover proper;
   each said catching pawl comprising an enlarged head portion and a resiliently deformable stay portion which extends from said head portion toward said cover proper;
   said spring holder comprising spaced walls between which said catching pawl is resiliently movably arranged, and a back wall which extends between said side walls.

22. A plastic wheel cover as claimed in claim 21, in which said stay portion of the catching pawl is integrally connected to said cover proper.

23. A plastic wheel cover as claimed in claim 21, in which said stay portion of the catching pawl is integrally connected to said back wall of said spring holder.

24. A plastic wheel cover as claimed in claim 21, in which said head portion is formed with a smoothly curved upper surface.

25. A plastic wheel cover as claimed in claim 24, in which the thickness of the stay portion of the catching pawl is less than that of the head portion of the same.

26. A plastic wheel cover as claimed in claim 24, in which each of said side walls is integrally formed with a reinforcing rib to effect a robust construction of the spring holder.

27. A plastic wheel cover as claimed in claim 24, in which each of said side walls of the spring holder has at its top a head leaving therebetween a slit into which a part of said ring spring is slidably received.

28. A plastic wheel cover as claimed in claim 27, in which said head is formed with a tapered surface in order to facilitate the setting of said ring spring to the spring holder.

29. A plastic wheel cover as claimed in claim 27, in which said head portion is formed with a slit into which a part of said ring spring is received.

30. A plastic wheel cover as claimed in claim 28, in which a mouth portion of the slit of said head portion is tapered to facilitate the insertion of the part of the ring spring thereinto.

31. A plastic wheel cover as claimed in claim 28, in which said slit of each side wall of the spring holder is inclined with respect to a major surface of said cover proper.

32. A plastic wheel cover as claimed in claim 28, in which the slit of said head portion is partitioned into two aligned parts by a partition portion.

33. A plastic wheel cover as claimed in claim 32, in which said slit of each side wall of said spring holder is an enclosed opening formed in the side wall.

34. A plastic wheel cover as claimed in claim 33, in which said aligned parts of said slit of said head portion receive therein opposed ends of said ring spring, and in which said enclosed opening of the side wall receives therein a part of said ring spring.

35. A plastic wheel cover as claimed in claim 28, in which said head portion of the catching pawl is formed at its generally middle portion with a recess which is merged with said slit of the head portion.

36. A plastic wheel cover as claimed in claim 35, in which said recess of said head portion receives therein bent end portions of said ring spring.

37. A plastic wheel cover as claimed in claim 21, further comprising:
 an annular wall integrally and concentrically mounted on the surface of said cover proper; and
 two extensions of said side walls of each spring holder, each extension being integrally connected to said annular wall.

38. A plastic wheel cover as claimed in claim 21, in which said stay portion of the catching pawl extends from a bridge portion which extends between said side walls of the spring holder.

39. A plastic wheel cover as claimed in claim 38, in which said stay portion of the catching pawl is outwardly protruded at the portion integrally connected to said bridge portion.

40. A plastic wheel cover as claimed in claim 39, in which the head portion of said catching pawl is formed with a rectangular recess leaving two spaced libs.

41. A plastic wheel cover as claimed in claim 40, in which, upon assembly, the leading ends of said spaced libs extend inwardly beyond said ring spring.

42. A plastic wheel cover as claimed in claim 21, in which said stay portion of the catching pawl is integrally connected to said cover proper through a bent portion, said bent portion having a generally S-shaped cross section.

* * * * *